United States Patent [19]
Levin

[11] 3,754,134
[45] Aug. 21, 1973

[54] ASYMMETRIC BEAM SPOTLIGHT

[75] Inventor: Robert E. Levin, Hamilton, Mass.

[73] Assignee: GTE Sylvania Incorporated, Danvers, Mass.

[22] Filed: May 30, 1972

[21] Appl. No.: 257,938

[52] U.S. Cl............ 240/41.37, 240/44.2, 240/103 R
[51] Int. Cl................................................ F21v 7/09
[58] Field of Search...................... 240/41.37, 44.2, 240/103 R

[56] References Cited
UNITED STATES PATENTS
3,492,474  1/1970  Yamaguchi et al.......... 240/41.37 X
2,992,322  7/1961  Motter............................. 240/44.2

Primary Examiner—Samuel S. Matthews
Assistant Examiner—Richard M. Sheer
Attorney—Norman J. O'Malley, Edward J. Coleman et al.

[57] ABSTRACT

An optical system comprising a light source and an asymmetric reflector for producing a noncircular beam of light having a generally oval cross section and wherein the intensity and angular extent of the beam are variable by moving the source axially with respect to the reflector. The reflector is defined by a continuous, asymmetric surface generated by a curve $v = f(u)$ in a meridian plane thereof, which curve varies angularly in successive meridian planes through an angle $\phi$ about a moving point $(R_o, \theta, Z_o)$ fixed with respect to the curve in each meridian plane and falling on a circle concentric with and in a plane normal to the optical axis Z of the reflector. The angular variation $\phi$ is described by the relation $\phi = g(\theta)$ and conforms to the restriction that $\phi$ is continuous and periodic on $\theta = 2\pi$, where angle $\theta$ describes the angular position of the meridian plane about the optical axis of the reflector.

7 Claims, 7 Drawing Figures

Patented Aug. 21, 1973 3,754,134

ASYMMETRIC BEAM SPOTLIGHT

BACKGROUND OF THE INVENTION

This invention relates to spotlight projectors and, more particularly, to projectors in which the light beam is noncircular and the beam size is variable.

Spotlight projectors are widely used in a number of fields, including the theatre, still photography, motion pictures, and television. In such applications it is desirable to provide an asymmetric beam shape, which departs from a circular, axially symmetric intensity distribution, for various purposes, such as matching the aspect ratio of associated cameras. The beam angle may be fixed, or it may be desired to vary it through a considerable range of angles; for example, a 2:1 variation or greater. 2

Asymmetric beam patterns have been produced by many techniques. The use of a lenticular refractor, such as employed on headlight lamps, generally is undesirable for spotlights due to cost, weight and heat trapping. Asymmetric beam patterns are produced by reflectors of revolution with asymmetric oriented sources such as the classic "bow tie" pattern of a paraboloid with a cross-axis incandescent filament. The intensity distribution of such a system, however, is not arbitrarily variable to match an a priori intensity distribution.

Many asymmetric reflectors are known. A principal known form comprises reflector sections of various specific shapes and orientations but fabricated as a single integral reflector, with each section producting a beam. These individual beams overalp in a prescribed manner to form the total asymmetric spotlight beam, as exemplified by U.S. Pat. No. 3,331,960, assigned to the assignee of the present application. Since individual components of the beam each depend on the relation of source to reflector section orientation, this system is very sensitive to mechanical tolerances. Diffusion, such as etching the reflecting surface, will reduce this sensitivity but, at the same time, reduce the control of the light.

SUMMARY OF THE INVENTION

Accordingly, it is an object of the present invention to provide an improved asymmetric beam spotlight unit having a reflector which is particularly suitable for variable beam applications.

Another object of the invention is to provide an asymmetric beam spotlight having a reflector of more simplified design, which enables more relaxed manufacturing tolerances, and which is suitable for use with a movable light source.

A further object of the invention is to provide a reflector for an asymmetric beam spotlight which provides more efficient use of the generated light.

In accordance with the invention, I have discovered a particular form of asymmetric reflector in which continguous sections of the reflective surface contribute luminous flux to contiguous regions of the illuminated field, and in which a small displacement of the luminous source primarily produces a displacement of the light beam as a whole without significantly changing the relative distribution of light flux within the beam. As a result, small changes in the light source position, light source aspect ratio, reflector surface contour, and the like, that comprise normal manufacturing and production tolerances, will not produce different effects on different parts of the light beam with the consequence of large changes of the spotlight intensity distribution. This invention produces a beam that is generally described as oval, and the design concept is directly related to the resulting beam of light. The design constraints on the shape of the reflecting surface are compatible with the most practical techniques of precisely forming the reflectors.

BRIEF DESCRIPTION OF THE DRAWINGS

This invention will be more fully described hereinafter in conjunction with the accompanying drawings, in which.

DESCRIPTION OF PREFERRED EMBODIMENT

Figures 1, 2:
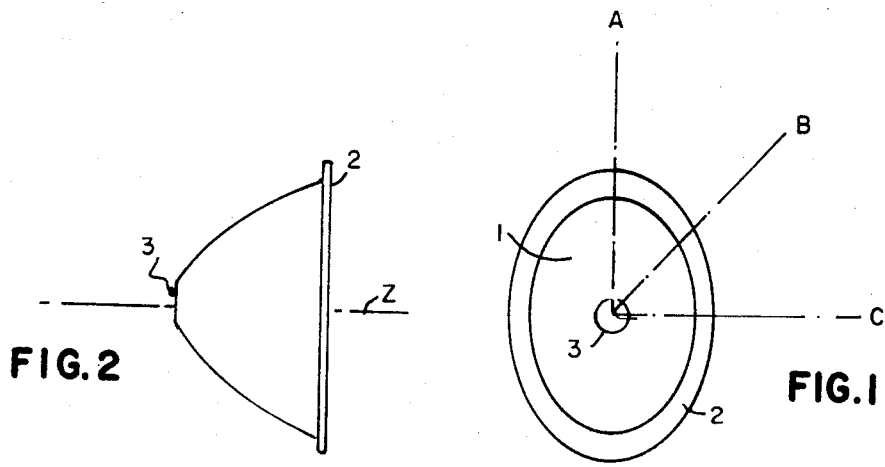
FIGS. 1 and 2 are front and side views, respectively, of a reflector according to the invention.

The general form of a concave reflector according to the invention is shown in FIGS. 1 and 2. The reflecting surface 1 is continuous and asymmetric with respect to the optical axis Z, and can be produced by many fabrication techniques, a typical one of which is hydroforming. Other suitable methods of manufacture include stamping, high velocity forming, deep drawing, electromagnetic forming, and electrodeposition. The reflector may be adapted for mounting by any convenient manner, for example by a flange 2, which may be formed as an integral part of the reflector. At the back of the reflector, concentric with its optical axis Z, a hole 3 is provided through which a light source may be introduced into the reflector.

Figure 3:
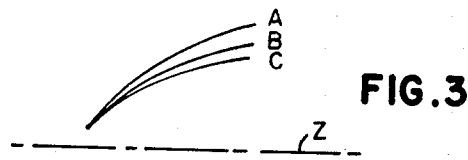
FIG. 3 shows a series of curves representing respectively identified meridian plane sections of the reflecting surface of FIG. 1.

Representative meridian plane sections of reflecting surface 1 are illustrated by the curves of FIG. 3, respectively identified as taken on lines A, B and C of FIG. 1.

Figure 4:
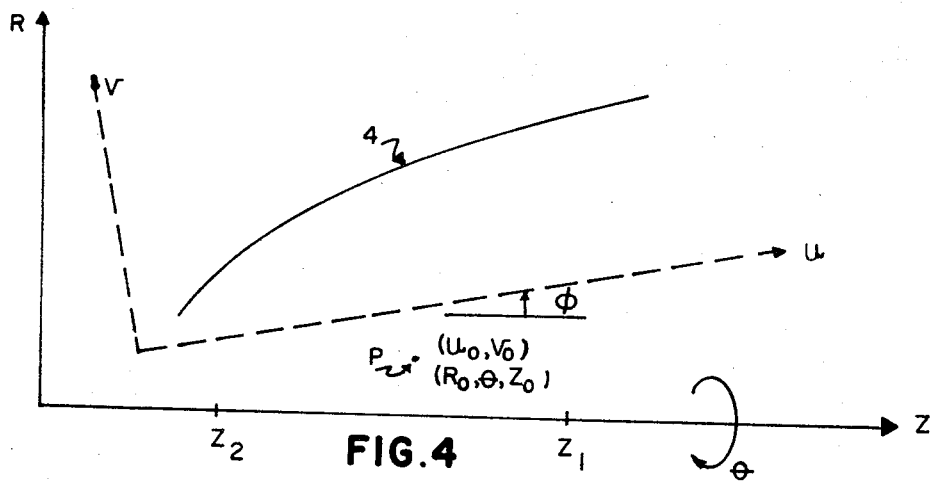
FIG. 4 is a generalized graphical illustration of the mathematical description of the reflecting surface of FIG. 1.

The mathematical form of the reflector will now be described with reference to FIG. 4. A specific curve 4, $v = f(u)$, is defined on a rectangular coordinate system $(u,v)$. A cylindrical coordinate system $(R,\theta,Z)$ is established for the reflector where the Z-axis is the optical axis of the reflector. The $(u,v)$ coordinate system always lies in a meridian plane, i.e., it contains the line $R = 0$. One point P, having the coordinates $(u_o,v_o)$ in each meridian plane, bears a fixed relation to the curve 4 for all meridian planes, namely, it coincides with the point $(R_o, \theta,Z_o)$ of the cylindrical coordinate system which generates a circular locus in three dimensions as $\theta$ varies. Thus, point P is a moving point fixed with respect to curve 4 in each meridian plane and falling on a circle concentric with and in plane normal to the optical axis Z.

In a preferred form, $R_o = 0$ is in the vicinity of the light source, but this is not a necessary condition to the principles of the invention.

The $(u,v)$ coordinate system rotates about point P, as described by angle $\phi$ between the lines $v = O$ and $R = O$, as the meridian plane rotates about the optical axis Z. Specifically, the relation is $\phi = g(\theta)$, where the angle $\theta$ describes the angular position of the meridian plane about the optical axis. Hence, as the reflecting surface is generated by the curve 4, said curve moves angularly in successive meridian planes through angle $\phi$ about the moving point P. In accordance with the invention, however, this angular variation must conform to the restriction that $\phi$ is continuous and periodic on $\theta = 2\pi$.

If the intensity distribution is required to possess symmetry about two orthogonal planes containing the optical axis, nominally the "horizontal" and "vertical" planes, $\phi$ is made an even function about $\theta = O$ and $\theta = \pi/2$. The reflector is formed by a section of this generated surface. In the preferred form the front of the reflector is in a plane normal to the optical axis, specifically, by cutting the generated surface by the plane $Z = Z_1$. It is preferred to provide an opening for the light source on the axis of the reflector. This may be done by cutting the generated surface by plane $Z = Z_2$. The principles and teachings of this invention apply equally well if the front of the reflector is defined in any other manner or if the light source is introduced into the reflector at some other location.

The selection of the functions $v = f(u)$ and $\theta = g(\theta)$ depends on the required intensity distribution and the form of the light source. The selection can be made by any of the techniques well-known to those versed in the art of reflector design. When the light source dimensions are small with respect to the reflector dimensions or when only the dimension parallel to the optical axis is large, the complete design process is simplified since each meridian plane section of the reflecting surface principally affects the intensity distribution in that same meridian plane. With these light source conditions, the spread of luminous flux in the sagittal plane for an element of the reflecting surface is small since the angular sagittal subtent of the source with respect to the reflector element is small. Techniques are well known, but more complicated, for other source forms.

Reflectors of a generally oval appearance have been made in the past, but they do not conform to the form and restrictions of this invention. Generally, these have been defined by reflector cross-sections in various parallel and/or orthogonal planes or defined by various conic or hyperconic equations. None of the oval reflectors under prior art conform to the relation between meridian plane sections as prescribed by the present invention.

In addition to permitting simple designs of asymmetric beam spotlights, this form of reflector possesses another singular advantage. It is simple to manufacture compared to other asymmetric forms. A single template representing the generating curve 4 controls the matching of a forming tool along the reflector surface in a meridian plane, i.e., a plane of constant $\theta$. As succeeding profiles of the forming tool are machined, the template is rotated ($\phi$ is varied) as a function of the displacement of the meridian plane. This procedure permits a single planar curve to be used to develope an asymmetric 3-dimensional surface in a manner analogous to the well known use of a planar curve for developing a surface of revolution.

Figure 5:
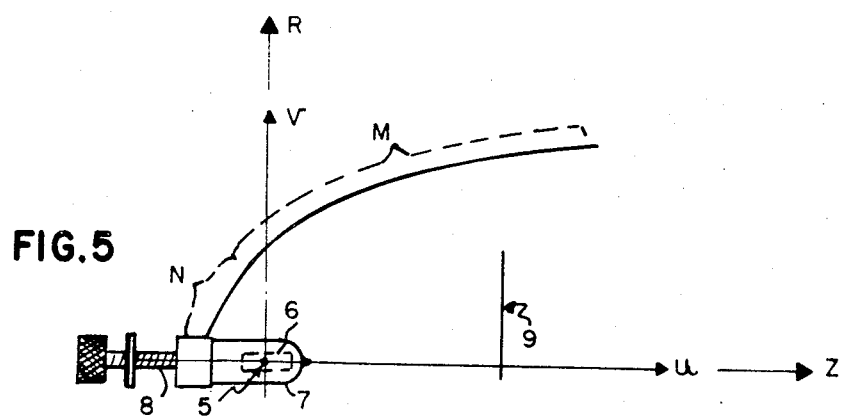
FIG. 5 is a schematic representation of a particular embodiment of a spotlight unit according to the invention, with the reflector illustrated by a single meridian section.

A specific embodiment of this invention is schematically represented in FIG. 5. This spotlight produces a photographically defined 26° × 34° beam to match the aspect ratio of specific camera formats. This is a more efficient utilization of the generated luminous flux than provided by a circular beam. The device operates at about two-thirds of the power of previously employed spotlights capable of performing the same function. The generating curve $x = f(u)$ is defined in two sections as M: $(0.29237u + 0.95630v)^2 = 1.91260u - 0.58474v + 1$ and N: $(0.12187u + 0.99255v)^2 = 1.98510u - 0.24374v + 1$ (dimensions in inches) The point P of rotation for the $(u,v)$ coordinate system is $u_o = v_o = O$ and $R_o = Z_o = O$, point 5 of FIG. 5. The source 6 is a coiled-coil CC-8 filament of a tungsten halogen incandescent lamp 7 supported within or in immediate proximity to the volume defined by the reflector surface and the aperture plane of the reflector. The axis of the secondary helix is coincident with the optical axis of the reflector ($R = O$). The overall helix length is approximately 0.375 inches, and the outer envelope of the helix has a diameter of approximately 0.133 inches. The helix is nearly centered on point 5, with the exact location being selected for the desired beam spread. Axial motion of this filament changes the beam spread and maximum intensity while maintaining the approximate angular beam divergence ratio of 26:34 over a photographically useful range. The axial motion can be provided by a screw 8 or by any other mechanism that generates linear motion.

Figure 6:
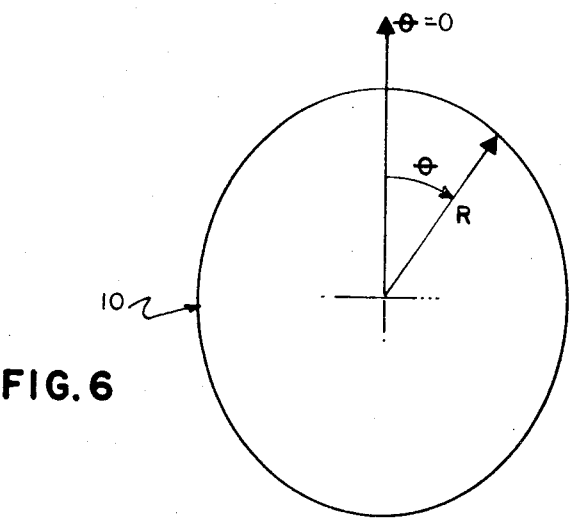
FIG. 6 is a schematic front view of the total reflector at plane 9 of FIG. 5.

The front of the reflector is defined by the plane $Z = 1.6262$, identified by the numeral 9. The relation $\phi = g(\theta)$ necessary to complete the specification is most easily visualized by an indirect specification. The front reflector aperture 10 in plane 9 is shown front view in FIG. 6. The $(u,v)$ coordinate system is rotated through the angle $\phi$ such that section M of the generating curve always intersects the closed curve 10. Curve 10 is defined by $$R = 1.48000(1 + 0.11755 \sin^2\theta)^-$$

Figure 7:
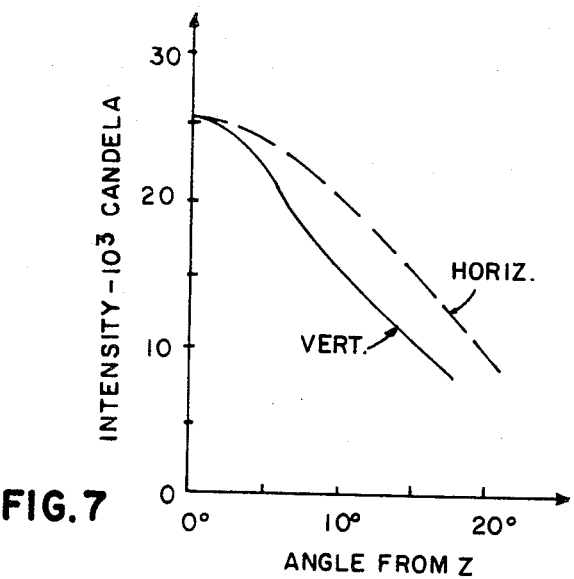
FIG. 7 shows the intensity distribution produced by the reflector of FIG. 5.

The resulting intensity distribution of this particular embodiment of the invention using a 3,400° K incandescent filament is shown in two orthogonal planes in FIG. 7. The normal "horizontal" plane is $\theta = \pi/2$, and the normal "vertical" plane is $\theta = 0$. The surface finish of the reflector is essentially specular but with a slight macroscopic roughness. This prevents a general diffusion of the light but smooths the beam irregularities due to the convolutions of the filament.

What I claim is:

1. A spotlight unit for producing a beam of noncircular and generally oval cross section comprising, a concave reflector defined by a continuous surface asymmetric with respect to its optical axis Z, said reflector having an aperture in a predetermined plane, and a light source supported substantially within the volume defined by said reflector surface and the aperture plane thereof, said reflector surface being generated by a curve $v = f(u)$ in a meridian plane section thereof, said curve moving angularly in successive meridian planes through an angle $\phi$ about a moving point P fixed with respect to said curve in each meridian plane, said point P falling on a circle concentric with and in a plane normal to the optical axis Z of said reflector, and said angular variation $\phi$ being described by the relation $\phi = g(\theta)$ and conforming to the restriction that $\phi$ is continuous and periodic on $\theta = 2\pi$, where angle $\theta$ describes the angular position of the meridian plane about the optical axis Z of said reflector.

2. The spotlight unit of claim 1 wherein said light source is an incandescent filament.

3. The spotlight unit of claim 1 in which said light source is movable in an axial direction with respect to said reflector for changing the angular spread of said beam.

4. The spotlight unit of claim 3 wherein said light source is an incandescent filament.

5. The spotlight unit of claim 1 wherein said reflector is defined by the generating curve described by $(0.29237u + 0.95630v)^2 = 1.91260u - 0.58474v + 1$ and $(0.12187u + 0.99255v)^2 = 1.98510u - 0.24374v + 1$ as two sections, and said generating curve motion $\phi = g(\theta)$ is described parametrically by constraining the curve to intersect the closed curve defined by $Z = 1.6262$ and $R = 1.48000(1 + 0.11755 \sin^2\theta)^-$ in the cylindrical coordinate system $(R,\theta,Z)$, with the point P defined as $u_o = v_o = O$ and $R_o = Z_o = O$.

6. The spotlight unit of claim 5 in which said light source is movable along the optical axis of said reflector for changing the angular spread of said beam.

7. The spotlight unit of claim 6 wherein said light source is an incandescent filament.

* * * * *